United States Patent
Haddock et al.

(10) Patent No.: US 8,844,234 B2
(45) Date of Patent: Sep. 30, 2014

(54) MOUNTING DEVICE USING OPPOSING SEAM FASTENERS FOR HOLLOW RIB STANDING SEAM PANELS

(71) Applicants: Robert M. M. Haddock, Colorado Springs, CO (US); Dustin M. M. Haddock, Colorado Springs, CO (US)

(72) Inventors: Robert M. M. Haddock, Colorado Springs, CO (US); Dustin M. M. Haddock, Colorado Springs, CO (US)

(*) Notice: Subject to any disclaimer, the term of this patent is extended or adjusted under 35 U.S.C. 154(b) by 0 days.

(21) Appl. No.: 13/712,474

(22) Filed: Dec. 12, 2012

(65) Prior Publication Data

US 2013/0145711 A1 Jun. 13, 2013

Related U.S. Application Data

(60) Provisional application No. 61/570,143, filed on Dec. 13, 2011.

(51) Int. Cl.
| | |
|---|---|
| *E04D 1/36* | (2006.01) |
| *E04D 1/34* | (2006.01) |
| *E04D 13/10* | (2006.01) |
| *F16B 5/00* | (2006.01) |
| *E04F 13/08* | (2006.01) |
| *F24J 2/52* | (2006.01) |

(52) U.S. Cl.
CPC ............ *E04F 13/0821* (2013.01); *E04D 13/10* (2013.01); *F16B 5/0096* (2013.01); *Y02B 10/20* (2013.01); *Y02E 10/47* (2013.01); *F24J 2/5249* (2013.01)
USPC .................................. 52/545; 52/463; 52/556

(58) Field of Classification Search
USPC ............. 52/543–545, 547, 548, 556, 24, 463, 52/800.12
See application file for complete search history.

(56) References Cited

U.S. PATENT DOCUMENTS

| | | | |
|---|---|---|---|
| 3,394,524 A | 7/1968 | Howarth | |
| 3,495,363 A | 2/1970 | Johnson | |
| 5,228,248 A | 7/1993 | Haddock | |
| 5,479,752 A * | 1/1996 | Menegoli | 52/549 |
| 6,256,934 B1 * | 7/2001 | Alley | 52/25 |
| 6,499,259 B1 * | 12/2002 | Hockman | 52/26 |
| 7,100,338 B2 * | 9/2006 | Haddock | 52/545 |
| 7,104,020 B1 * | 9/2006 | Suttle | 52/551 |
| 7,513,080 B1 * | 4/2009 | Showalter | 52/24 |

(Continued)

FOREIGN PATENT DOCUMENTS

JP  2001-303724  10/2001

OTHER PUBLICATIONS

Snobar—The Ultimate in Snow Retention for Standing Seam Roofs [online]; [Retrieved on Oct. 11, 2013]; Retrieved from www.snowbar.com.

*Primary Examiner* — Elizabeth A Plummer
(74) *Attorney, Agent, or Firm* — James L. Johnson; Marsh Fischmann & Breyfogle LLP (57) ABSTRACT

A building system (38) is disclosed in the form of a standing seam panel assembly (80) and one or more mounting devices (40). The mounting device (40) includes a slot (52) for receiving at least an upper section of a hollow seam rib (86) of the panel assembly (80). At least one opposing pair of seam fasteners (74) engage opposing sides of the seam rib (86). These seam fasteners (74) may be activated to significantly reduce the size of an open space that initially exists between opposing, spaced internal surfaces (92a, 92b) of the seam rib (86).

16 Claims, 8 Drawing Sheets

(56) References Cited

U.S. PATENT DOCUMENTS

| | | | |
|---|---|---|---|
| 7,703,256 B2 * | 4/2010 | Haddock | 52/543 |
| D658,977 S * | 5/2012 | Riddell et al. | D8/394 |
| 8,528,888 B2 * | 9/2013 | Header | 269/91 |
| 2002/0088196 A1 * | 7/2002 | Haddock | 52/543 |
| 2004/0055233 A1 | 3/2004 | Showalter | |
| 2005/0102958 A1 * | 5/2005 | Anderson | 52/698 |
| 2007/0289233 A1 * | 12/2007 | Haddock | 52/309.4 |
| 2010/0171016 A1 * | 7/2010 | Haddock | 248/237 |

\* cited by examiner

MOUNTING DEVICE USING OPPOSING SEAM FASTENERS FOR HOLLOW RIB STANDING SEAM PANELS

CROSS-REFERENCE TO RELATED APPLICATIONS

This patent application is a non-provisional patent application of, and claims priority to, U.S. Provisional Patent Application Ser. No. 61/570,143, that is entitled "MOUNTING DEVICE USING OPPOSING SEAM FASTENERS FOR HOLLOW RIB STANDING SEAM PANELS," that was filed on 13 Dec., 2011, and the entire disclosure of which is hereby incorporated by reference in its entirety herein.

FIELD OF THE INVENTION

The present invention generally relates to mounting devices for standing seam roofs, where the standing seams are in the form of hollow seam ribs.

BACKGROUND

Metal panels are being increasingly used to define building surfaces such as roofs and sidewalls. One type of metal panel is a standing seam panel, where portions of adjacent standing seam panels of the building surface are interconnected/nested in a manner that defines a standing seam. Standing seam panels are expensive compared to other metal panels, and building surfaces defined by metal panels may be more costly than other types of building surface constructions.

It is often desirable to install various types of structures on building surfaces, such as heating, air conditioning, and ventilation equipment. Installing structures on standing seam panel building surfaces in a manner that punctures the building surface at one or more locations is undesirable in a number of respects. One is simply the desire to avoid puncturing what is a relatively expensive building surface. Another is that increasing the number of locations where a metal panel building surface is punctured may increase the potential for leakage and/or corrosion.

SUMMARY

A first aspect of the present invention is embodied by a building system that includes a building surface and at least one mounting device. The building surface includes a plurality of panels that are interconnected to define a plurality of standing seams. Each standing seam is in the form of a hollow seam rib that is defined by a pair of adjacent, interconnected panels.

The mounting device used by the first aspect includes a mounting body, which in turn includes a slot of a non-adjustable configuration. At least an upper section of one of the hollow seam ribs of the building surface is disposed within the slot. A first seam fastener extends through the mounting body, into the slot, and engages a first side of the corresponding hollow seam rib. A second seam fastener extends through the mounting body, into the slot, and into engagement with a second side of the same hollow seam rib. The first and second seam fasteners are axially aligned. Opposing internal surfaces of the hollow seam rib at a first location are spaced apart by a distance of at least about 0.35 inches prior to engaging the first and second seam fasteners with the hollow seam rib, with the first location coinciding with where the first and second seam fasteners will engage the hollow seam rib. An open space exists throughout an entirety of the spacing between these opposing internal surfaces (e.g., no other structure exists in the spacing between these opposing internal surfaces). At least one attachment mounting fastener is extendable into the mounting body.

A number of feature refinements and additional features are applicable to the first aspect of the present invention. These feature refinements and additional features may be used individually or in any combination. The following discussion is applicable to the first aspect, up to the start of the discussion of a second aspect of the present invention.

The slot may be defined by a first slot sidewall, a second slot sidewall, and a base that extends between the first and second slot sidewalls. The first slot sidewall may be characterized as always being maintained in a fixed position relative to the second slot sidewall based upon the non-adjustable configuration of the slot (e.g., the mounting body may be configured such that the orientation/position of the first slot sidewall may not be adjusted relative to the orientation/position of the second slot sidewall).

A first transition section (e.g., curved, for instance defined by a single radius; chamfered, for instance a flat surface that diverges away from a centerline of the slot proceeding away from the slot base) may be provided between the slot base and the first slot sidewall, while a second transition section (e.g., curved, for instance defined by a single radius; chamfered, for instance a flat surface that diverges away from a centerline of the slot proceeding away from the slot base) may be provided between the slot base and the second slot sidewall. The slot base may be in the form of a flat or planar surface. The first slot sidewall may be at least substantially defined by first and second flat sections, with the first transition section being located between the slot base and the first flat section of the first slot sidewall, and with the first flat section of the first slot sidewall being located between the first transition section and the second flat section of the first slot sidewall. The second slot sidewall may be at least substantially defined by first and second flat sections, with the second transition section being located between the slot base and the first flat section of the second slot sidewall, and with the first flat section of the second slot sidewall being located between the second transition section and the second flat section of the second slot sidewall.

A first included angle may be defined between the slot base and the first flat section of the first slot sidewall. A second included angle may be defined between the slot base and the first flat section of the second slot sidewall. The first and second included angles may each be of a common magnitude (e.g., such that the first flat section of the first slot sidewall is the mirror image of the first flat section of the second slot sidewall). The first and second included angles each may be greater than 90°. The magnitude of the first and second included angles each may be within a range of about 93° to about 105°. In one embodiment, the magnitude of each of the first and second angles is about 97°.

The second flat section of the first slot sidewall may be the mirror image of the second flat section of the second slot sidewall. The second flat section of the first slot sidewall may be parallel to the second flat section of the second slot sidewall. In one embodiment, the first seam fastener extends through the second flat section of the first slot sidewall, while the second seam fastener extends through the second flat section of the second slot sidewall.

A third included angle may be defined between the first and second flat sections of the first slot sidewall, while a fourth included angle may be defined between the first and second flat sections of the second slot sidewall. The third and fourth included angles are each substantially greater than 90° but less than 180°. In one embodiment, the third and fourth included angles are each within a range of about 165° to about 177°. In one embodiment, the magnitude of each of the third and fourth angles is about 173°.

A first slot depth section may extend away from a base of the slot, and a second slot depth section may extend away from the first slot depth section (such that the first slot depth section is located between the slot base and the second slot depth section). A width of the slot may continually increase throughout the first slot depth section proceeding away from the slot base and in the direction of the second slot depth section. The width of the slot may be at least substantially constant throughout the second slot depth section.

The first and second seam fasteners are axially aligned in the case of the first aspect. The first and second seam fasteners may move along a common axis and relative to the mounting body to engage/disengage a hollow seam rib disposed within the slot. In one embodiment, the first and second seam fasteners are each threadably engaged with the mounting body. Any appropriate number of seam fasteners may extend through the mounting body and engage the first side of the hollow seam rib, and any appropriate number of seam fasteners may extend through the mounting body and engage the second side of the hollow seam rib. Preferably, each seam fastener that extends through the mounting body to engage the first side of the hollow seam rib is axially aligned with a seam fastener that extends through the mounting body to engage the second side of the hollow seem rib (e.g., disposed/ movable along a common axis).

A first region of an internal surface of the hollow seam rib may be characterized as being directly opposite of where the first seam fastener engages the first sidewall of the hollow seam rib on an exterior thereof. A second region of an internal surface of the hollow seam rib (disposed oppositely of the above-noted first region) may be characterized as being directly opposite of where the second seam fastener engages the second sidewall of the hollow seam rib on an exterior thereof. In the case of the first aspect, the first and second regions are separated by a distance of at least about 0.35 inches. In the case of the first aspect, an open space exists throughout the spacing between these first and second regions.

The opposing internal surfaces of the hollow seam rib at the first location may be spaced apart by no more than about 0.125 inches after engaging the first and second seam fasteners with the hollow seam rib (again where these opposing internal surfaces of the hollow seam rib at the first location were initially spaced apart by distance of at least about 0.35 inches prior to activating the first and second seam fasteners). The opposing internal surfaces of the hollow seam rib at the first location may be in contact with each other after engaging the first and second seam fasteners with the hollow seam rib (again where these opposing internal surfaces of the hollow seam rib at the first location were initially spaced apart by distance of at least about 0.35 inches prior to activating the first and second seam fasteners).

A second aspect of the present invention is embodied by an installation method for a standing seam building surface that includes a hollow seam rib. Opposing internal surfaces of this hollow seam rib are separated by an open space having a width of at least about 0.35 inches at a first location and that spans an entirety of the spacing between these opposing internal surfaces (e.g., no other structure exists in the spacing between these opposing internal surfaces). A mounting body is positioned on the hollow seam rib by disposing the hollow seam rib within a slot of the mounting body. A first seam fastener is moved along a first axial path in a first direction to advance the first seam fastener relative to the mounting body and into the slot to engage a first sidewall of the hollow seam rib at the first location. A second seam fastener is moved along this same first axial path in a second direction to advance the second seam fastener relative to the mounting body and into the slot to engage a second sidewall of the hollow seam rib at the first location. The opposing internal surfaces of the hollow seam rib are disposed within 0.125 inches of each other at the first location and measured along the first axial path by the movement of the first and second seam fasteners (e.g., the first and second seam fasteners are activated to reduce the spacing between opposing internal surfaces of the hollow seam rib).

A number of feature refinements and additional features are applicable to the second aspect of the present invention. These feature refinements and additional features may be used individually or in any combination. The following discussion is applicable to the second aspect, up to the start of the discussion of a third aspect of the present invention.

The movement of the first and second seam fasteners may be terminated so that the opposing internal surfaces of the hollow seam rib remained spaced from each other at the first location, but still within the spacing limit set forth by the second aspect. The movement of the first and second seam fasteners may be continued until the opposing internal surfaces of the hollow seam rib actually contact one another at the first location. The movement of the first and second seam fasteners may be characterized as compressing and/or collapsing the hollow seam rib at the first location.

A third aspect of the present invention is embodied by an installation method for a standing seam building surface that includes a hollow seam rib defined by first and second sidewalls that are separated from one another by an open space that extends from an interior of the first sidewall to an interior of the second sidewall (e.g., no other structure exists in the spacing between these opposing interior portions of the first and second sidewalls). A mounting body is positioned on the hollow seam rib by disposing the hollow seam rib within a slot of the mounting body. The first sidewall of the hollow seam rib is moved at least about 0.125 inches through the open space and in a direction of the second sidewall of the hollow seam rib at least in response to advancement of a first seam fastener relative to the mounting body and into the slot to engage the first sidewall of the hollow seam rib. The second sidewall of the hollow seam rib is moved at least about 0.125 inches through the open space and in a direction of the first sidewall of the hollow seam rib at least in response to advancement of a second seam fastener relative to the mounting body and into the slot to engage the second sidewall of the hollow seam rib. The first and second seam fasteners are advanced along a common axial path in the case of the third aspect, but in opposite directions to provide the noted movement of the first and second sidewalls of the hollow seam rib.

A number of feature refinements and additional features are applicable to the third aspect of the present invention. These feature refinements and additional features may be used individually or in any combination. The following discussion is applicable to at least the third aspect.

The first sidewall of the hollow seam rib may be moved at least about 0.15 inches in one embodiment, and at least about 0.175 inches in another embodiment, through the open space and in the direction of the second sidewall of the hollow seam rib at least in response to advancement of the first seam fastener relative to the mounting body and into the slot to engage the first sidewall of the hollow seam rib. The second sidewall of the hollow seam rib may be moved at least about 0.15 inches in one embodiment, and at least about 0.175 inches in another embodiment, through the open space and in the direction of the first sidewall of the hollow seam rib at least in response to advancement of the second seam fastener relative to the mounting body and into the slot to engage the second sidewall of the hollow seam rib.

Opposing internal surfaces of the hollow seam rib, opposite of where the first and second seam fasteners engage an exterior of the hollow seam rib, may be separated by a distance of at least about 0.35 inches prior to any engagement of the first and second seam fasteners with the exterior hollow seam rib. The movement of the first and second sidewalls of the hollow seam rib provided by the first and second seam fasteners may be undertaken to dispose opposing internal surfaces of the hollow seam rib, opposite of where the first and second seam fasteners engage an exterior of the hollow seam rib, within 0.125 inches of each other. The advancement of the first and second seam fasteners may be terminated so that opposing internal surfaces of the hollow seam rib, opposite of where the first and second seam fasteners engage an exterior of the hollow seam rib, remain spaced from one another. The movement of the first and second sidewalls of the hollow seam rib provided by the first and second seam fasteners may be undertaken to dispose opposing internal surfaces of the hollow seam rib, opposite of where the first and second seam fasteners engage an exterior of the hollow seam rib, in contact with one another.

A number of feature refinements and additional features are separately applicable to each of above-noted aspects of the present invention as well. These feature refinements and additional features may be used individually or in any combination in relation to each of these aspects.

The mounting body may be of one-piece construction. For instance, the mounting body may be of an integral construction (e.g., an extruded part). The mounting body may be characterized as lacking any joints of any kind. Each portion of the mounting body may be characterized as always being maintained in a fixed position relative to a remainder of the mounting body (e.g., by having the mounting body be of one-piece construction; such that the mounting body itself includes no separable parts). The mounting body may be formed from any appropriate material or combination of materials (e.g., a metal alloy).

Each seam fastener used by the mounting device may be threadably engaged with the mounting body. Any appropriate number of seam fasteners of the mounting device may engage a common sidewall of the hollow seam rib (e.g., at locations spaced along the length or length dimension of the hollow seam rib; one, two, or more seam fasteners may extend through a first slot sidewall of the slot to engage the hollow seam rib at different locations along the length or length dimension of the hollow seam rib; one, two, or more seam fasteners may extend through a second slot sidewall of the slot to engage the hollow seam rib at different locations along the length or length dimension of the hollow seam rib). Each seam fastener may be configured so as to only interface with an exterior surface of the hollow seam rib on which the associated mounting body is disposed. For instance, the end of each seam fastener may be convex, rounded, or of a blunt-nosed configuration to provide a desirable interface with a hollow seam rib (e.g., non-penetrating).

An attachment may be positioned on the mounting body and may be secured relative to the mounting body by at least one attachment mounting fastener. In one embodiment, the mounting body includes a flat upper surface and the attachment is positioned on this flat upper surface. The attachment may be of any appropriate type and/or configuration. One or more attachment mounting fasteners may be directed through the attachment and may threadably engage the mounting body to secure the attachment relative to the mounting body. Multiple mounting devices may be installed on the building surface in the above-noted manner to install such an attachment on the building surface.

Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that the mounting device includes "a seam fastener" alone does not mean that the mounting device includes only a single seam fastener). Moreover, any failure to use phrases such as "at least one" also does not limit the corresponding feature to the singular (e.g., indicating that a mounting device includes "a seam fastener" alone does not mean that the mounting device includes only a single seam fastener). Use of the phrase "at least generally" or the like in relation to a particular feature encompasses the corresponding characteristic and insubstantial variations thereof (e.g., indicating that a surface is at least generally flat encompasses the surface being flat). Finally, a reference of a feature in conjunction with the phrase "in one embodiment" does not limit the use of the feature to a single embodiment.

DETAILED DESCRIPTION

Figure 1:
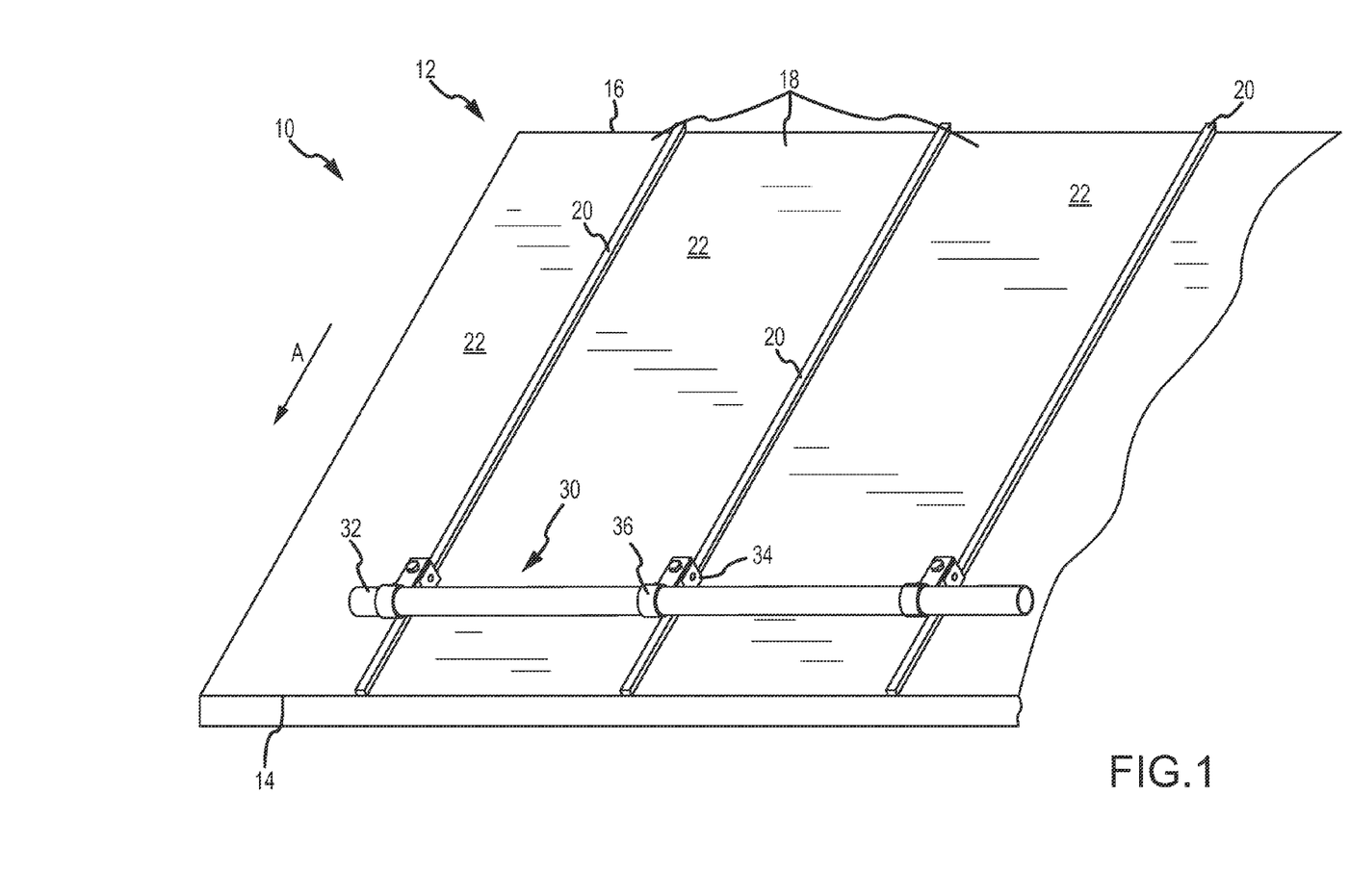
FIG. 1 is a perspective view of one type of attachment (in the form of a cross member assembly for snow retention) installed on a roofing surface.

FIG. 1 presents one embodiment of what may be referred to as a building or roofing system 10 (hereafter "roofing system 10"). The roofing system 10 includes a cross member assembly 30 that is installed on a building/roofing surface 12 (e.g., to provide a snow retention function, and hereafter "roofing surface 12"). Generally, the roofing surface 12 may be defined in any appropriate manner and may be of any appropriate configuration. For instance, the roofing surface 12 may include one or more roofing sections, each of which may be of any appropriate pitch/slope and/or shape. The cross member assembly 30 may be installed at any appropriate location on the roofing surface 12 and in any appropriate manner, and furthermore the cross member assembly 30 may be of any appropriate length. Multiple cross member assemblies 30 may be used and disposed in any appropriate arrangement.

The roofing surface 12 illustrated in FIG. 1 is but one representative configuration that may be utilized by the roofing system 10. The roofing surface 12 may be of any pitch, but at least generally slopes downwardly in a direction denoted by arrow A in FIG. 1 from a peak 16 of the roofing surface 12 to an edge 14 of the roofing surface 12. Multiple panels 18 (e.g., metal panels) collectively define the roofing surface 12. The interconnection of each adjacent pair of panels 18 in the illustrated embodiment defines a standing seam 20 (only schematically illustrated in FIG. 1).

The standing seams 20 may at least generally proceed in the direction of or along the slope or pitch of the roofing surface 12 (e.g., the pitch of the length dimension of the standing seams 20 may match the pitch of the corresponding portion of the roofing surface 12). Each panel 18 includes at least one base section 22 that is at least generally flat or planar and that is disposed between each adjacent pair of standing seams 20 on the roofing surface 12. Each panel 18 could include one or more crests, minor ribs, intermediate ribs, parcel ribs, striations, fluting, or flutes between its corresponding pair of standing seams 20 so as to provide multiple base sections 22 on each panel 18 (not shown).

The panels 18 may be of any appropriate configuration so to allow them to be interconnected or nested in a manner that defines a standing seam 20, and the standing seams 20 may be disposed in any appropriate orientation relative to the base sections 22 of the panels 18 that define the standing seam 20. Generally, the standing seams 20 may be characterized as at least initially extending orthogonally (e.g., perpendicularly) relative to the base sections 22 of the corresponding panels 18. The illustrated standing seams 20 may be characterized as having a vertical end section, or as being of a vertical standing seam configuration. However, the end sections of the various standing seams 20 could also have portions that are horizontally disposed (e.g., at least generally parallel with the base sections 22 of the corresponding panels 18), or as being of a horizontal standing seam configuration.

The cross member assembly 30 is installed on the roofing surface 12. The cross member assembly 30 generally includes at least one mounting device 34, an adapter 36 for each mounting device 34, and a cross member 32 that extends through at least one adapter 36. That is, each adapter 36 is configured to receive at least a portion of the cross member 32. While the cross member 32 may provide the function of a snow retention device, or a structure that at least attempts to impede or retard the movement of snow and/or ice down the inclined roofing surface 12, the cross member 32 may provide any appropriate function or combination of functions. In any case, the adapter 36 and cross member 32 may be collectively referred to as an "attachment" that is interconnected with the roofing surface 12 by multiple mounting devices 34 in the illustrated embodiment. The mounting devices 34 may be used to install any appropriate type of attachment on the roofing surface 12.

One embodiment of a building/roofing system is illustrated in FIGS. 2A-F and is identified by reference numeral 38. The building system 38 includes at least one mounting device 40 and a standing seam panel assembly 80. Typically the building system 38 will utilize a plurality of mounting devices 40 to mount an attachment of any appropriate type/configuration (e.g., cross member assembly 30) to the standing seam panel assembly 80.

Figure 2A:
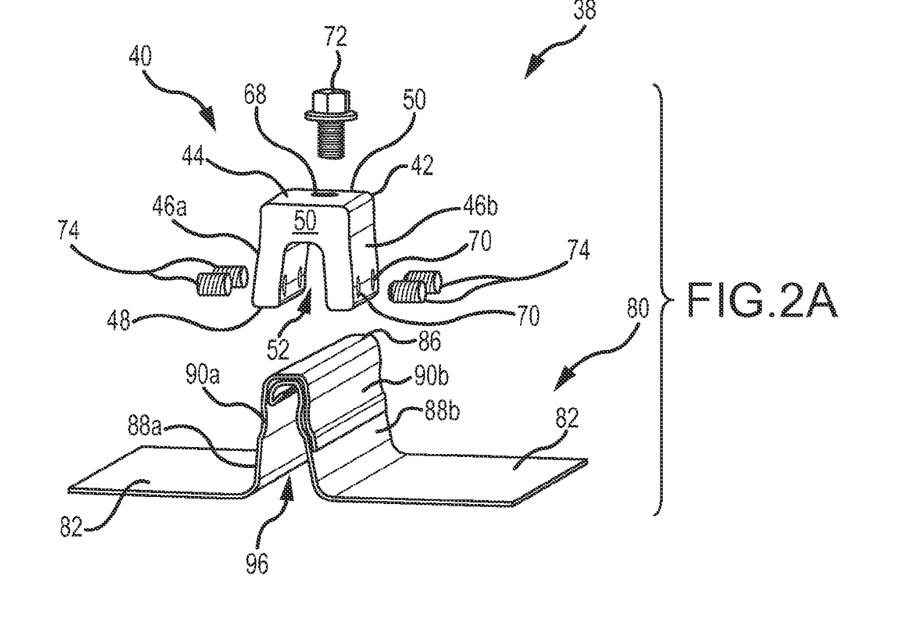
FIG. 2A is an exploded, perspective view of one embodiment of a mounting device and a standing seam panel assembly of a first configuration, where the standing seams are in the form of hollow seam ribs.
Figure 2B:
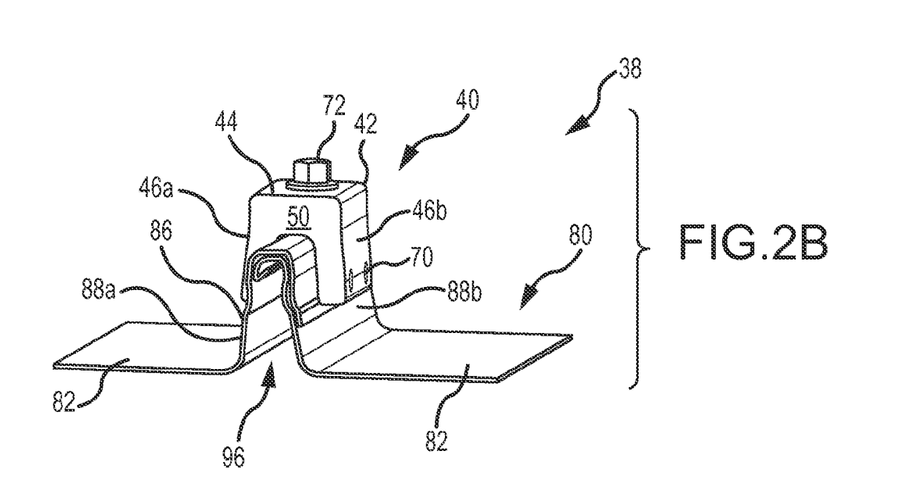
FIG. 2B is a perspective view of the mounting device of FIG. 2A positioned on a hollow seam rib of the standing seam panel assembly of FIG. 2A.

The mounting device 40 is in the form of a mounting body 42, at least one attachment mounting fastener 72, and at least one seam fastener 74. The mounting body 42 may be of one-piece construction (e.g., an extruded part). The mounting body 42 may be characterized as lacking any joints of any kind. The mounting body 42 may be configured so as to have no separable parts.

The mounting body 42 may be formed from any appropriate material or combination of materials (e.g., a metal alloy), and includes an upper section 44, an oppositely disposed bottom section 48, a pair of oppositely disposed side sections 46a, 46b, and a pair of oppositely disposed end sections 50. The spacing between the end sections 50 coincides with a length dimension for the mounting body 42, the spacing between the side sections 46a, 46b coincides with a width dimension for the mounting body 42, and the spacing between the upper section 44 and the bottom section 48 coincides with a height or depth dimension for the mounting body 42 (as well as for a slot 52, discussed below).

The upper section 44 of the mounting body 42 includes at least one flat section. A substantial portion of the upper section 44 is flat in the illustrated embodiment—all except the transition between the upper section 44 and each of the two side sections 46a, 46b which may be rounded and/or chamfered. A single reference plane may contain at least a substantial portion of the upper section 44 of the mounting body 42. In any case, typically the mounting device 40 will be installed on the standing seam panel assembly 80 such that its upper section 44 projects at least generally upwardly to accommodate supporting one or more attachments that may be appropriately secured to the mounting body 42. In this regard, the upper section 44 may include at least one threaded hole 68 on a flat section thereof (one in the illustrated embodiment; any appropriate number of threaded holes 68 may be utilized; multiple threaded holes 68 typically being spaced along the length dimension of the mounting body 42) for receiving a corresponding attachment mounting fastener 72 (e.g., the attachment mounting fastener 72 may be threaded into a pre-defined threaded hole 68 on a flat section of the upper section 44 and may extend into the mounting body 42). Another option is for the attachment mounting fastener 72 to be self-tapping (i.e., so as to not require a threaded hole in the mounting body 42 prior to initially installing the attachment mounting fastener 72 on the mounting body 42).

The bottom section 48 of the mounting body 42 includes a slot 52 that extends between the two end sections 50 of the mounting body 42, and that is located between the pair of side sections 46a, 46b of the mounting body 42. This slot 52 is defined by a slot base 54 and a pair of slot sidewalls 56a, 56b. The slot sidewalls 56a, 56b are spaced apart to receive at least an end section of a hollow seam rib 86 of the standing seam panel assembly 80. The slot 52 may be of a non-adjustable configuration, such that the first slot sidewall 56a is always maintained in a fixed position relative to the second slot sidewall 56b (e.g., the mounting body 42 may be configured such that the position/orientation of the first slot sidewall 56a cannot be changed relative to the position/configuration of the second slot sidewall 56b).

The slot base 54 may include a flat or planar section. In one embodiment, the slot base 54 is at least generally parallel with the upper section 44 of the mounting body 42. Each of the slot sidewalls 56a, 56b may include a first flat section 58 and a second flat section 60. A curved transition section 62 (e.g., defined by a single radius) may be disposed between the slot base 52 and the first flat section 58 of each slot sidewall 56a, 56b. The first flat section 58 of each of the slot sidewalls 56a, 56b is disposed between its corresponding second flat section 60 and its corresponding curved transition section 62. Other configurations may be used for the transition section, such as a chamfer (a flat surface that extends downwardly from the slot base 54 in the view shown in FIG. 2C, as well as away from a vertical reference plane that extends through the center of the slot 52 (the "center" in the width or "left-to-right" dimension in the view shown in FIG. 2C).

Figure 2C:
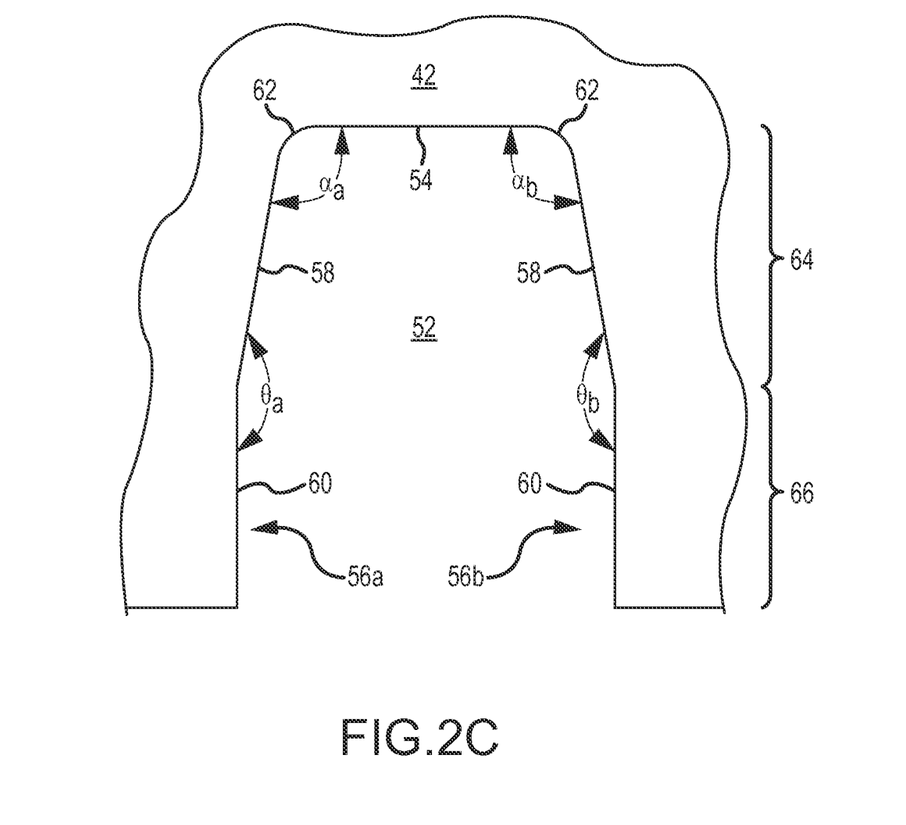
FIG. 2C is an enlarged end view of the slot for the mounting device shown in FIGS. 2A and 2B.

A first included angle $\alpha_a$ is defined between the slot base 54 and the first flat section 58 of the first slot sidewall 56a (e.g., FIG. 2C). One embodiment has this first included angle $\alpha_a$ being greater than 90°. Another embodiment has this first included angle $\alpha_a$ being within a range from about 93° to about 105°. Another embodiment has this first included angle $\alpha_a$ being about 97°. Similarly, a first included angle $\alpha_b$ is defined between the slot base 54 and the first flat section 58 of the second slot sidewall 56b. One embodiment has this first included angle $\alpha_b$ being greater than 90°. Another embodiment has this first included angle $\alpha_b$ being within a range from about 93° to about 105°. Another embodiment has this first included angle $\alpha_b$ being about 97°. The first flat section 58 of the first slot sidewall 56a may be the mirror image of the first flat section 58 of the second slot sidewall 56b. As such, the magnitudes of the first included angle $\alpha_a$ and the magnitude of the first included angle $\alpha_b$ may be at least substantially the same.

A second included angle $\theta_a$ is defined between the first flat section 58 and the second flat section 60 of the first slot sidewall 56a. One embodiment has this second included angle $\theta_a$ being greater than 90° and less than 180°. Another embodiment has this second included angle $\theta_a$ being within a range of about 165° to about 177°. Another embodiment has this second included angle $\theta_a$ being about 173°. Similarly, a second included angle $\theta_b$ is defined between the first flat section 58 and the second flat section 60 of the second slot sidewall 56b. One embodiment has this second included angle $\theta_b$ being greater than 90° and less than 180°. Another embodiment has this second included angle $\theta_b$ being within a range of about 165° to about 177°. Another embodiment has this second included angle $\theta_b$ being about 173°. The first flat section 58 and second flat section 60 of the first slot sidewall 56a may be the mirror image of the first flat section 58 and the second flat section 60, respectively, of the second slot sidewall 56b. As such, the magnitudes of the second included angle $\theta_a$ and the magnitude of the second included angle $\theta_b$ may be at least substantially the same.

The entire depth of the slot 54 may be defined by a first slot depth section 64 and a second slot depth section 66 (e.g., FIG. 2C), where the first slot depth section 64 is located between the slot base 54 and the second slot depth section 66. The first slot depth section 64 may be characterized as that portion of the depth of the slot 52 where the width of the slot 52 progressively increases proceeding away from the slot base 54. The first slot depth section 64 may coincide with the first flat sections 58 of the first and second slot sidewalls 56a, 56b, but may also include any transition sections 62 between the slot base 54 and the slot sidewalls 56a, 56b. The spacing between the first flat sections 58 of the first and second slot sidewalls 56a, 56b may progressively increase proceeding in the direction of their corresponding second flat section 60.

The second slot depth section 66 may coincide with the second flat sections 60 of the first and second slot sidewalls 56a, 56b. In the illustrated embodiment, the second flat sections 60 of the first and second slot sidewalls 56a, 56b are at least substantially parallel to each other. As such, the width of the slot 52 may remain at least substantially constant throughout the second slot depth section 66.

At least one threaded hole 70 (two in the illustrated embodiment; any appropriate number of threaded holes 70 may be utilized; multiple threaded holes 70 typically being spaced along the length dimension of the body 42) may extend from the side section 46a, through the mounting body 42, and intersect the first slot sidewall 56a. An appropriate seam fastener 74 may be directed through a given threaded hole 70 of the mounting body 42 so as to extend into the slot 52 to engage the hollow seam rib 86 as will be discussed in more detail below. In one embodiment, each seam fastener 74 only interfaces with an exterior surface of a hollow seam rib 86 disposed in the slot 52. For instance, a nose 76 of each seam fastener 70 that interfaces with such a hollow seam rib 86 may be convex, rounded, or of a blunt-nosed configuration to provide a desirable interface with panel assembly 80 (e.g., non-penetrating). Another option is for the seam fastener(s) 70 to be self-tapping (i.e., so as to not require a threaded hole prior to initially installing the seam fastener 70 on the mounting body 70).

At least one threaded hole 70 (two in the illustrated embodiment; any appropriate number of threaded holes 70 may be utilized; multiple threaded holes 70 typically being spaced along the length dimension of the body 42) may extend from the side section 46b, through the mounting body 42, and intersect the second slot sidewall 56b. An appropriate seam fastener 74 may be directed through a given threaded hole 70 of the mounting device 40 so as to extend into the slot 52 to engage an opposite side of the hollow seam rib 86 as will be discussed in more detail below.

Figure 2D:
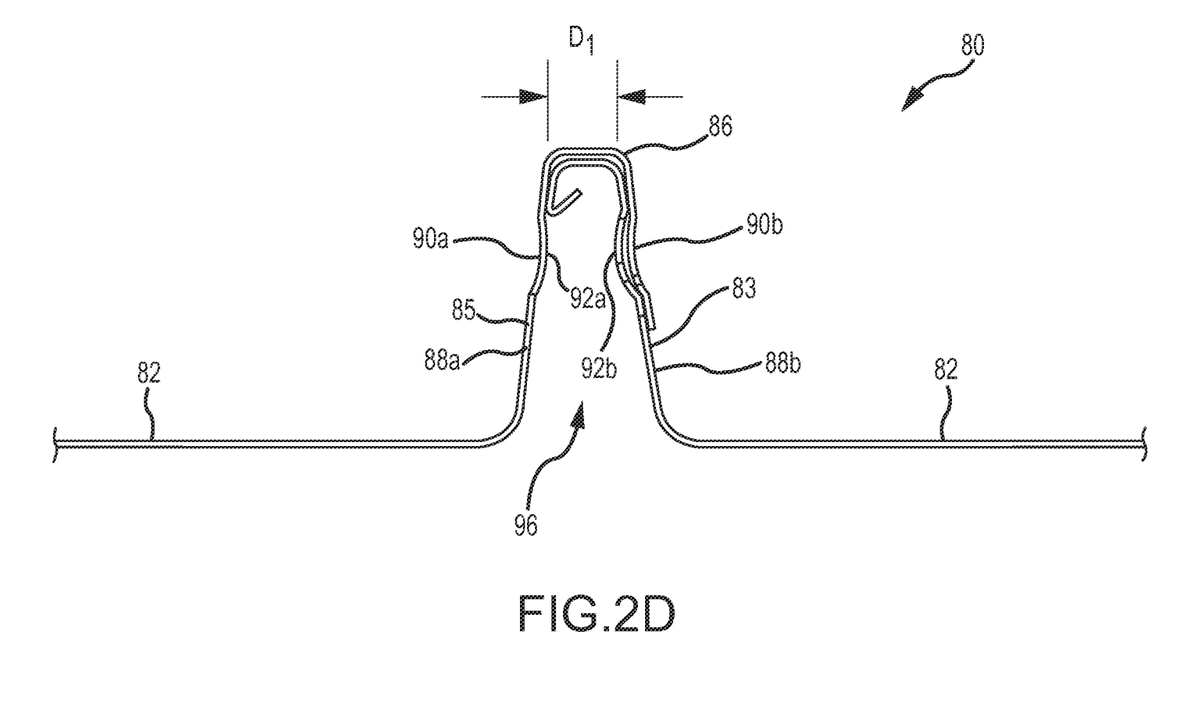
FIG. 2D is an enlarged end view of the standing seam panel assembly shown in FIGS. 2A and 2B.

FIG. 2D presents an enlarged view of the panel assembly 80. The panel assembly 80 may be used to define any appropriate surface, including a roofing surface. The panel assembly 80 is defined by a plurality of panels 82. Each panel 82 includes a left seam rib section 83 (a rib section used to define a hollow seam rib 86), along with a right seam rib section 85 (a rib section used to define a seam 52). The left seam rib section 83 and right seam rib section 85 of a given panel 82 are spaced in the width dimension of the panel 82. Each panel 82 may include one or more flat sections, as well as one or more other structures such as crests, minor ribs, intermediate ribs, pencil ribs, striations, fluting, or flutes.

Generally, the right seam rib section 85 for the left panel 82 in FIG. 2D may be positioned over the left seam rib section 83 for the right panel 82 illustrated in FIG. 2D to define a standing seam in the form of a hollow seam rib 86. Multiple panels 82 may be interconnected in this same general manner to define a panel assembly 80 of a desired size (both in the length and width dimensions).

Each hollow seam rib 86 of the panel assembly 80 may be characterized as having a first sidewall 88a and an oppositely disposed second sidewall 88b that are disposed in spaced relation. The first sidewall 88a includes an indentation 90a on an exterior of the seam rib 86, while the second sidewall 88b includes an indentation 90b on an exterior of the seam rib 86. The indentations 90a and 90b are disposed in opposing relation (e.g., disposed along a common axis that is orthogonal to the height of the hollow seam rib 86).

The seam rib 86 is of a hollow configuration, including an open space 96. A portion 92a of an internal surface of the seam rib 86 that is opposite of the indentation 90a (on the exterior of the seam rib 86) is spaced from a portion 92b of an opposing internal surface of the seam rib 86 that is opposite of the indentation 90b (on the exterior of the seam rib 86). In one embodiment, the portions 92a, 92b of the opposing internal surfaces of the seam rib 86 are separated by a distance $D_1$ of at least about 0.35 inches (prior to being engaged by any seam fasteners 74). In one embodiment, the portions 92a, 92b of the opposing internal surfaces of the seam rib 86 are separated by a distance $D_1$ within a range of about 0.35 inches to about 0.736 inches (prior to being engaged by any seam fasteners 74). The open space 96 occupies the entire distance between the portions 92a, 92b of the opposing internal surfaces of the hollow seam rib 86. No other structure exists in this open space 96 throughout the entirety of the span between the portions 92a, 92b.

Figure 2E:
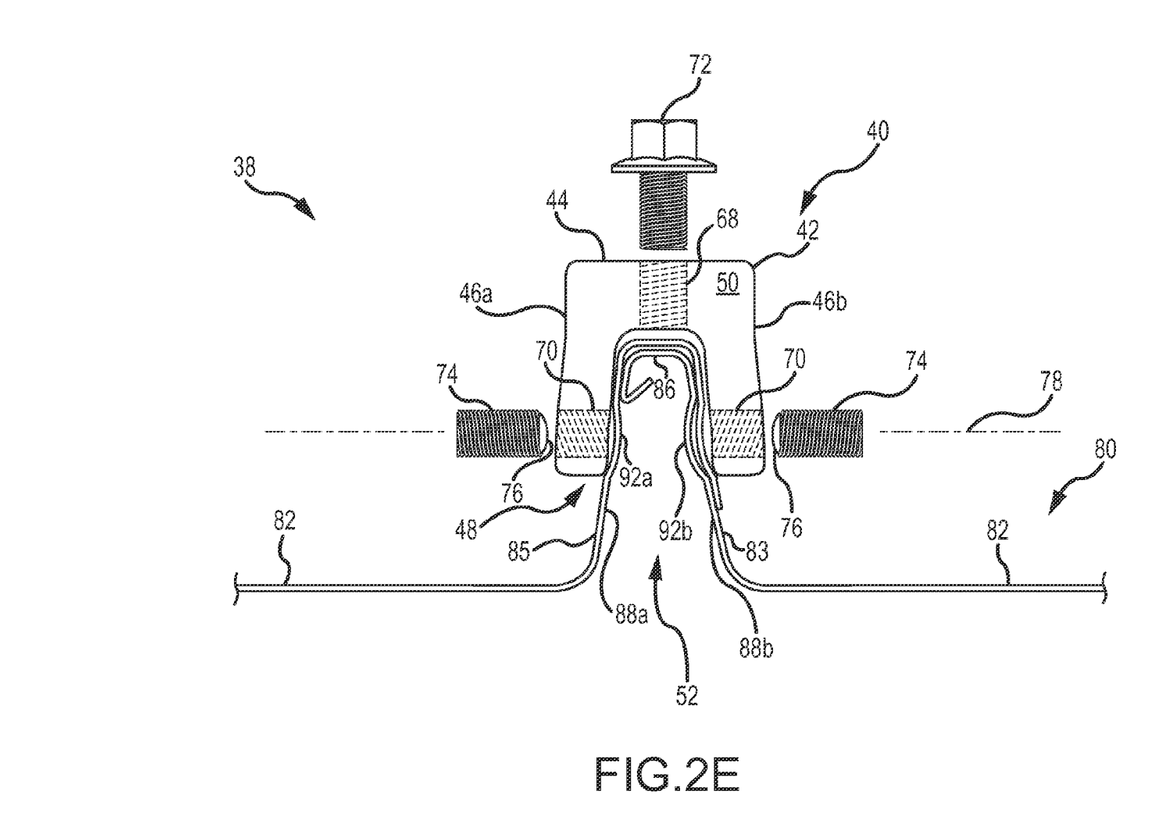
FIG. 2E is an end view of the arrangement shown in FIG. 2B, but prior to engaging opposing seam fasteners so as to at least substantially collapse the hollow seam rib at locations coinciding with the opposing seam fasteners.

The mounting device 40 is positioned over at least an upper section of the hollow seam rib 86 of the standing seam panel assembly 80, namely by directing the hollow seam rib 86 within its slot 52. Referring now to FIG. 2E, each seam fastener 74 that extends through the side section 46a of the mounting body 42 is axially aligned with the indentation 90a on the exterior of the first sidewall 88a of the hollow seam rib 86. Similarly, each seam fastener 74 that extends through the side section 46b of the mounting body 42 is axially aligned with the indentation 90b on the exterior of the second sidewall 88b of the hollow seam rib 86.

Each seam fastener 74 that extends through the side section 46a of the mounting body 42 is axially aligned with a different, single seam fastener 74 that extends through the side section 46b of the mounting body 42. That is, each seam fastener 74 that extends through the side section 46a of the mounting body 42 is disposed along a common axis 78 with a different seam fastener 74 that extends through the side section 46b of the mounting body 42. The mounting device 40 may therefore be characterized as having at least one pair of seam fasteners 74 that are disposed in opposing relation (two pairs of opposing seam fasteners 74 in the illustrated embodiment). Each seam fastener 74 that extends through the side section 46a is movable along a common axis 78 with one seam fastener 74 that extends through the side section 46b. Each such common axis 78 will also pass through the indentation 90a on the exterior of the first sidewall 88a of the hollow seam rib 46 and the indentation 90b on the exterior of the second sidewall 88b of the hollow seam rib 86.

Based upon the foregoing, when an opposing pair of seam fasteners 74 are moved relative to the mounting body 42 and toward one another (along a common axis 78, but in opposite directions), the seam fastener 74 of this pair that extends through the side section 46a will contact the indentation 90a on the exterior of the first sidewall 88a of the hollow seam rib 86, while the seam fastener 74 of this same pair that extends through the side section 46b will contact the indentation 90b on the exterior of the second sidewall 88b of the hollow seam rib 86.

Figure 2F:
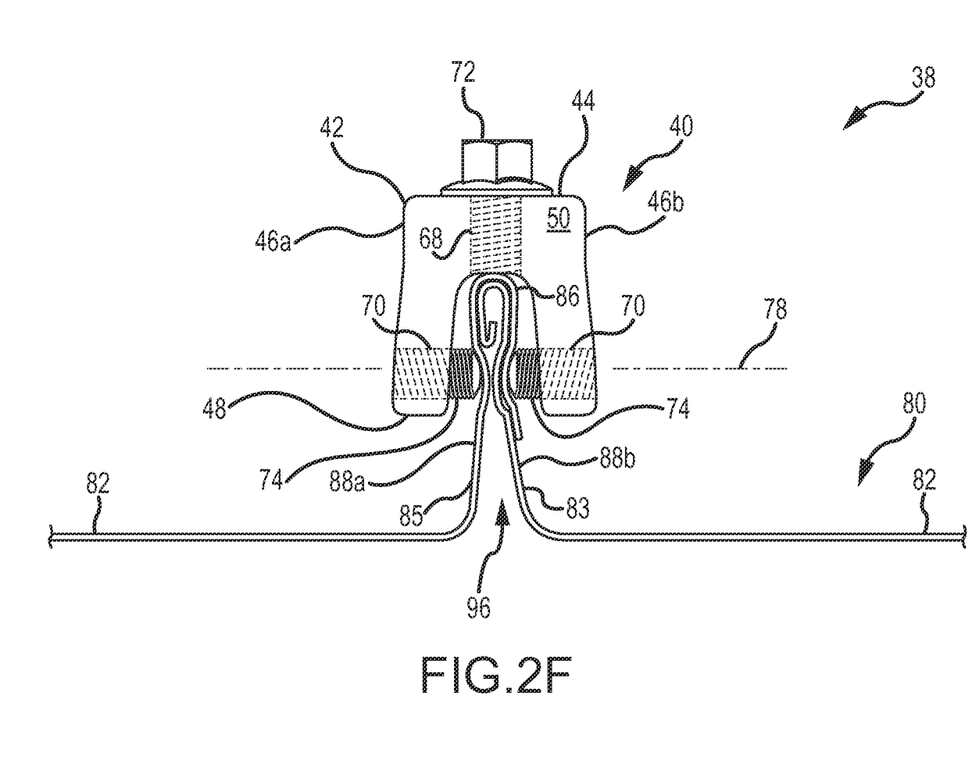
FIG. 2F is an end view of the arrangement shown in FIG. 2B, but after engaging opposing seam fasteners so as to at least substantially collapse the hollow seam rib at two spaced locations coinciding with the two pairs of opposing seam fasteners.

Referring now to FIG. 2F, each opposing pair of seam fasteners 74 may be moved relative to the mounting body 42 (along a common axis 78, but in opposite directions) to compress or collapse the hollow seam rib 86 at a discrete location (coinciding with the seam fasteners 74 of each pair of opposing seam fasteners 74). In one embodiment, each opposing pair of seam fasteners 74 are moved in opposite directions along a common axis 78 such that the portion 92a on the internal surface of the seam rib 86 (disposed opposite of the indentation 90a on the exterior of the first sidewall 88a of the seam rib 86) is spaced no more than about 0.125 inches (measured along the axis 78) from the portion 92b on the opposing internal surface of the seam rib 86 (disposed opposite of the indentation 90b on the exterior of the second sidewall 88b of the seam rib 86). Each opposing pair of seam fasteners 74 may be moved in opposite directions along a common axis 78 such that the portion 92a on the internal surface of the seam rib 86 (disposed opposite of the indentation 90a on the exterior of the first sidewall 88a of the seam rib 86) actually contacts the portion 92b on the opposing internal surface of the seam rib 86 (disposed opposite of the indentation 90b on the exterior of the second sidewall 88b of the seam rib 86). Each instance provides an enhanced lift-off resistance—a resistance to pulling the mounting device 10 off of the hollow seam rib 86.

It should be noted that the open space 96 occupies the entirety of the spacing between the opposing portions 92a, 92b on the interior of the hollow seam rib 86. For each pair of opposing seam fasteners 74, the seam fastener 74 that extends beyond the first slot sidewall 56a may move the first sidewall 88a of the hollow seam rib 86 through this open space 96 at least about 0.125 inches in the direction of the second sidewall 88b of the hollow seam rib 86 in one embodiment, at least about 0.15 inches in the direction of the second sidewall 88b of the hollow seam rib 86 in another embodiment, and at least about 0.175 inches in the direction of the second sidewall 88b of the hollow seam rib 86 in another embodiment, while the opposing seam fastener 74 that extends beyond the second slot sidewall 56b may move the second sidewall 88b of the hollow seam rib 86 through this open space 96 at least about 0.125 inches in the direction of the first sidewall 88a of the hollow seam rib 86 in one embodiment, at least about 0.15 inches in the direction of the first sidewall 88a of the hollow seam rib 86 in another embodiment, and at least about 0.175 inches in the direction of the first sidewall 88a of the hollow seam rib 86 in another embodiment.

Figure 3A:
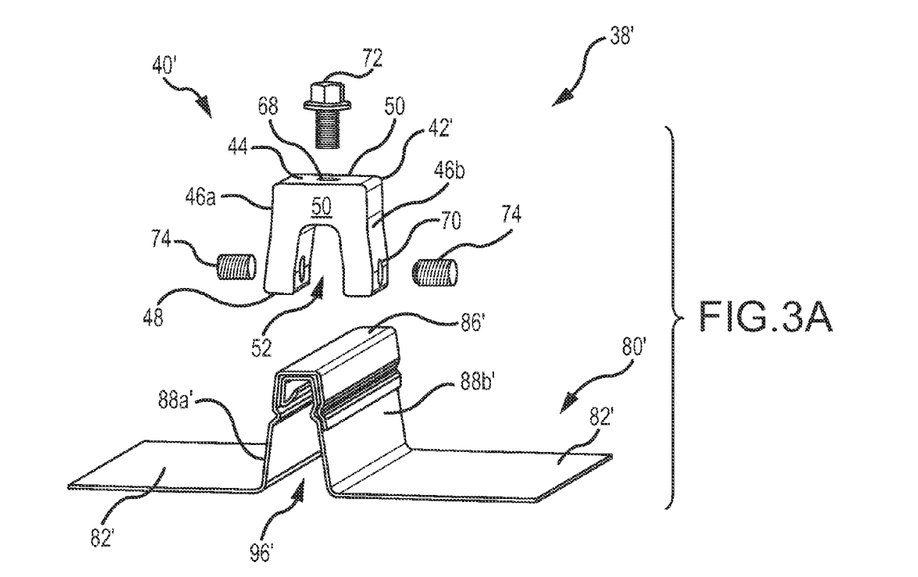
FIG. 3A is a perspective view of one embodiment of a mounting device and a standing seam panel assembly of a second configuration, where the standing seams are in the form of hollow seam ribs.
Figure 3B:
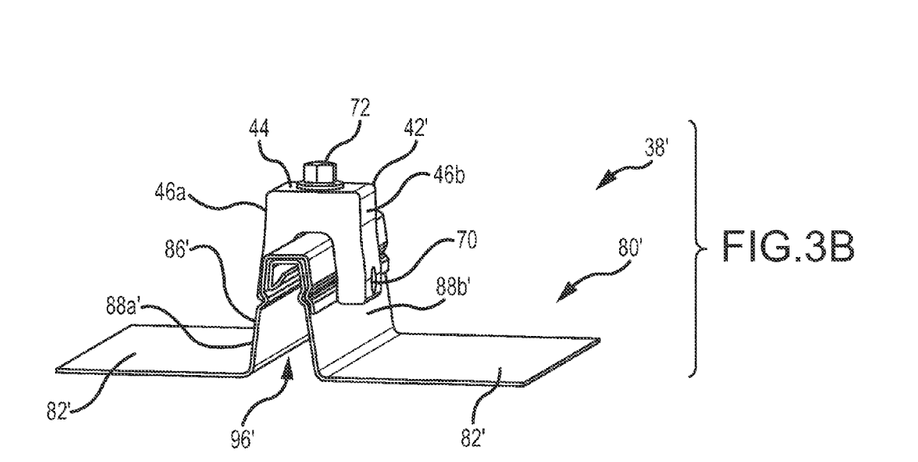
FIG. 3B is a perspective view of the mounting device of FIG. 3A positioned on a hollow seam rib of the standing seam panel assembly of FIG. 3A.
Figure 3C:
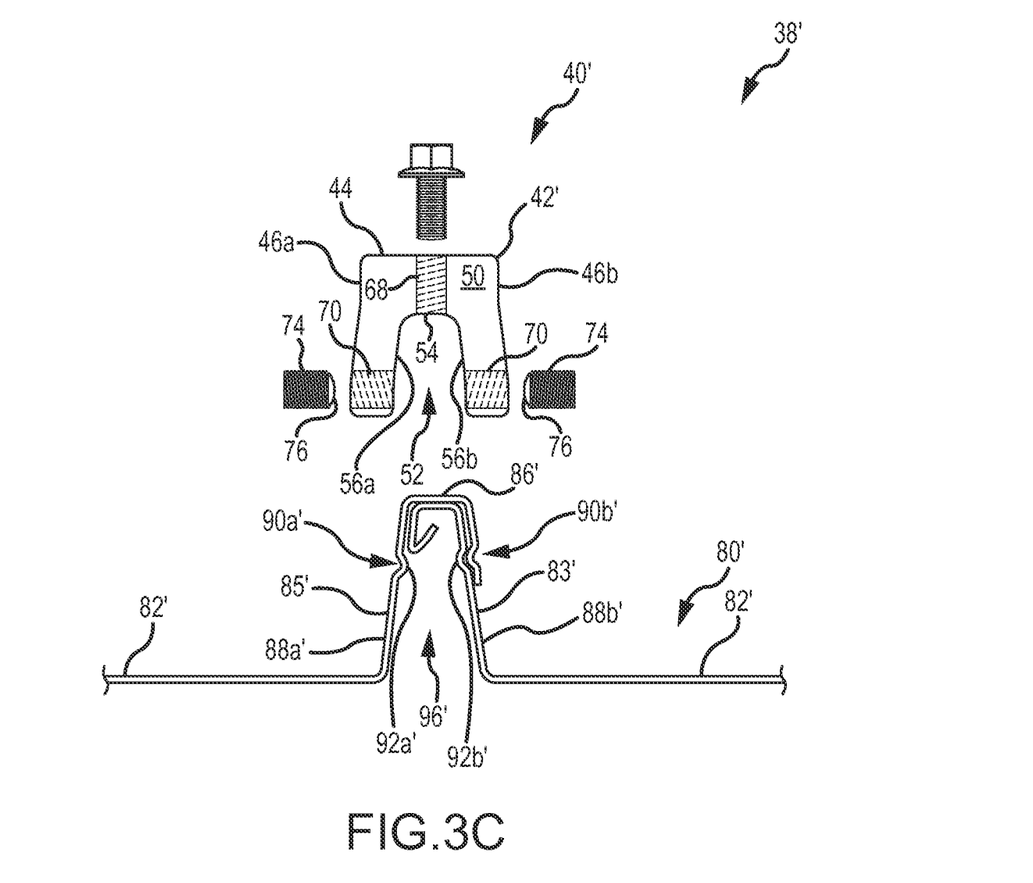
FIG. 3C is an end view of the arrangement shown in FIG. 3A.

FIGS. 3A-C present a variation of the building/roofing system 38 of FIGS. 2A-F. Corresponding components are identified by the same reference numeral. Those corresponding components that differ in at least some respect are identified by a "single prime" designation in FIGS. 3A-C. The roofing system 38' of FIGS. 3A-C uses a different mounting device 40', as well as a different panel assembly 80'.

The primary difference between the mounting device 40' of FIGS. 3A-C and the mounting device 40 of FIGS. 2A-F is that the mounting device 40' uses only a single pair of opposing seam fasteners 74 (versus two pairs of opposing seam fasteners 74 used by the mounting device 40 of FIGS. 2A-F). As such, the mounting body 42' of the mounting device 40' may be characterized as being "shorter" in the length dimension (coinciding with the spacing between the ends 50) than the mounting body 42 of the mounting device 40.

The panel assembly 80' uses panels 82' of a different configuration (compared to FIGS. 2A-F) to define hollow seam ribs 86'. The left seam rib section 83' and right seam rib section 85' of the panels 82' are of a different configuration as presented above, including having a different configuration for the indentations 90a', 90b', which provides a different configuration for the first sidewall 88a' and the second sidewall 88b', a different configuration for the portions 92a', 92b' of opposing internal surfaces of the seam rib 86', and a different configuration for the open space 96' of the hollow seam rib 86'.

The panels 82' are assembled in the above-noted manner to define a building or roofing surface. The mounting device 40' utilizes the same configuration or profile for the slot 52, and its single pair of opposing seam fasteners 74 engage the corresponding hollow seam rib 86' in the above-discussed manner.

It should be appreciated that the mounting device 40 (FIGS. 2A-F) may be used on the panel assembly 80' (FIGS. 3A-C), and that the mounting device 40' (FIGS. 3A-C) may be used on the panel assembly 80 (FIGS. 2A-F). Each of the mounting devices 40, 40' may be used by any panel assembly defined panels of the type described herein (where each panel includes two seam rib sections that are spaced in its width dimension, such that one seam rib section of one panel may be "nested" with a seam rib section of an adjacent panel to define a standing seam in the form of a hollow seam rib).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A building system comprising:
a building surface comprising a plurality of interconnected panels and a plurality of standing seams, wherein each said standing seam is in the form of a hollow seam rib defined by a pair of adjacent, interconnected panels; and
at least one mounting device, wherein each said mounting device comprises:
a mounting body;
a slot extending into said mounting body and having a non-adjustable configuration, wherein at least an upper section of one of said hollow seam ribs of said building surface is disposed within said slot;
a first seam fastener that extends through said mounting body, into said slot, and into engagement with a first side of said hollow seam rib;
a second seam fastener that extends through said mounting body, into said slot, and into engagement with a second side of said hollow seam rib, wherein said first and second seam fasteners are axially aligned, wherein opposing internal surfaces of said hollow seam rib at a first location are spaced apart by a distance of at least about 0.35 inches prior to engaging said first and second seam fasteners with said hollow seam rib and measured along a first axial path, wherein an open space exists throughout an entirety of the spacing between said opposing internal surfaces of said hollow seam rib at said first location prior to engaging said hollow seam rib with said first and second seam fasteners, wherein said opposing internal surfaces of said hollow seam rib are disposed no more than about 0.125 inches from each other, at said first location and measured along said first axial path, after engaging said first and second seam fasteners with said hollow seam rib by said first seam fastener deflecting said first side of said hollow seam rib in the direction of said second side of said hollow seam rib and by said second seam fastener deflecting said second side of said hollow seam rib in the direction of said first side of said hollow seam rib, and wherein said first location coincides with where said first and second seam fasteners engage said hollow seam rib; and
at least one attachment mounting fastener extendable into said mounting body.

2. The building system of claim 1, wherein a configuration of said mounting body is selected from the group consisting of one-piece construction, including no separable parts, an extrusion, and all combinations thereof.

3. The building system of claim 1, wherein said slot is defined by a first slot sidewall, a second slot sidewall, and a slot base extending between said first and second slot sidewalls.

4. The building system of claim 3, wherein said first slot sidewall is always maintained in a fixed position relative to said second slot sidewall based upon said non-adjustable configuration of said slot.

5. The building system of claim 3, wherein said slot is further defined by first and second curved transition sections, wherein said slot base is flat, wherein said first slot sidewall comprises a first flat section and a second flat section with said first curved transition section being disposed between said first flat section of said first slot sidewall and said slot base and with said first flat section of said first slot sidewall being located between said first curved transition section and said second flat section of said first slot sidewall, wherein said second slot sidewall comprises a first flat section and a second flat section with said second curved transition section being disposed between said first flat section of said second slot sidewall and said slot base and with said first flat section of said second slot sidewall being located between said second curved transition section and said second flat section of said second slot sidewall, wherein a first included angle exists between said slot base and said first flat section of said first slot sidewall, wherein a second included angle exists between said slot base and said first flat section of said second slot sidewall, and wherein said first and second included angles are each greater than 90°.

6. The building system of claim 5, wherein said first and second included angles are of a common magnitude.

7. The building system of claim 6, wherein a magnitude of each of said first and second included angles is within a range of about 93° to about 105°.

8. The building system of claim 5, wherein said first flat section of said first slot sidewall is orientated as a mirror image of said first flat section of said second slot sidewall.

9. The building system of claim 5, wherein said second flat section of said first slot sidewall is oriented as a mirror image of said second flat section of said second slot sidewall.

10. The building system of claim 5, wherein said second flat section of said first slot sidewall and said second flat section of said second slot sidewall are either parallel to one another or generally parallel to one another.

11. The building system of claim 10, wherein a third included angle exists between said first and second flat sections of said first slot sidewall, wherein a fourth included angle exists between said first and second flat sections of said second slot sidewall, and wherein said third and fourth included angles are each substantially greater than 90° but less than 180°.

12. The building system of claim 11, wherein a magnitude of each of said third and fourth included angles is within a range of about 165° to about 177°.

13. The building system of claim 10, wherein said first seam fastener extends through said second flat section of said first slot sidewall, and wherein said second seam fastener extends through said second flat section of said second slot sidewall.

14. The building system of claim 1, wherein a first slot depth section extends away from a slot base in a depth dimension, wherein a second slot depth section extends away from said first slot depth section in said depth dimension with said first slot depth section being located between said slot base and said second slot depth section in said depth dimension, wherein a width of said slot continually increases throughout said first slot depth section proceeding from said slot base and in a direction of said second slot depth section, and wherein said width of said slot is constant throughout said second slot depth section.

15. The building system of claim 1, wherein said opposing internal surfaces of said hollow seam rib at said first location are in contact after engaging said first and second seam fasteners with said hollow seam rib.

16. The building system of claim 1, further comprising:
an attachment positioned on said mounting device and secured to said mounting device via said at least one attachment mounting fastener.

* * * * *